(12) United States Patent
Sullivan

(10) Patent No.: US 11,138,528 B2
(45) Date of Patent: Oct. 5, 2021

(54) MANAGING PROFESSIONAL DEVELOPMENT

(75) Inventor: Daniel J. Sullivan, Toronto (CA)

(73) Assignee: The Strategic Coach, Toronto (CA)

(*) Notice: Subject to any disclaimer, the term of this patent is extended or adjusted under 35 U.S.C. 154(b) by 7 days.

(21) Appl. No.: 12/534,783

(22) Filed: Aug. 3, 2009

(65) Prior Publication Data

US 2011/0029353 A1 Feb. 3, 2011

(51) Int. Cl.
*G06Q 10/06* (2012.01)

(52) U.S. Cl.
CPC .................... *G06Q 10/06* (2013.01)

(58) Field of Classification Search
None
See application file for complete search history.

(56) References Cited

U.S. PATENT DOCUMENTS

| | | | |
|---|---|---|---|
| 4,489,958 A | 12/1984 | Martin | |
| 5,247,438 A | 9/1993 | Subas et al. | |
| 5,263,158 A | 11/1993 | Janis | |
| 5,388,198 A | 2/1995 | Layman et al. | |
| 5,457,476 A | 10/1995 | Jenson | |
| 5,655,118 A | 8/1997 | Heindel et al. | |
| 5,673,691 A | 10/1997 | Abrams et al. | |
| 5,729,745 A | 3/1998 | Reina et al. | |
| 5,745,110 A | 4/1998 | Ertemalp | |
| 5,758,083 A | 5/1998 | Singh et al. | |
| 5,812,132 A | 9/1998 | Goldstein | |
| 5,839,901 A | 11/1998 | Karkanen | |
| 5,855,006 A | 12/1998 | Huemoeller et al. | |
| 5,873,108 A | 2/1999 | Goyal et al. | |
| 5,890,131 A | 3/1999 | Ebert et al. | |
| 5,890,905 A | 4/1999 | Bergman | |
| 5,907,490 A | 5/1999 | Oliver | |
| 5,954,510 A * | 9/1999 | Merrill et al. | 434/236 |
| 5,978,648 A | 11/1999 | George et al. | |
| 6,012,037 A | 1/2000 | Yoshikawa | |
| 6,042,383 A | 3/2000 | Herron | |
| 6,167,362 A | 12/2000 | Brown et al. | |
| 6,308,164 B1 | 10/2001 | Nummelin et al. | |
| 6,313,852 B1 | 11/2001 | Ishizaki et al. | |

(Continued)

FOREIGN PATENT DOCUMENTS

| | | |
|---|---|---|
| CA | 2711875 | 2/2011 |
| CN | 1030809 C | 1/1996 |
| WO | WO1993009499 A1 | 5/1993 |

OTHER PUBLICATIONS

Goal Pro. "Success Studios Goal Pro 5.0" Jun. 2000, downloaded from web.archive.org/www.goalpro.com [retrieved on Dec. 15, 2006).

(Continued)

*Primary Examiner* — Mehmet Yesildag
(74) *Attorney, Agent, or Firm* — Carr & Ferrell LLP

(57) ABSTRACT

Systems and methods for managing professional development are provided. A client provides information indicating a current status, which may concern a professional task performed by the client and a portion of income associated with the task. The progress of the client toward a professional goal is calculated, and a recommendation concerning an appropriate next step is communicated to the client. Professional goals may include a level of income, efficiency, type of tasks performed, etc.

20 Claims, 5 Drawing Sheets

(56) References Cited

U.S. PATENT DOCUMENTS

| | | | |
|---|---|---|---|
| 6,501,473 | B1 | 12/2002 | Hayes et al. |
| 6,526,418 | B1 | 2/2003 | Midgley et al. |
| 6,560,639 | B1 | 5/2003 | Dan et al. |
| 6,854,088 | B2 | 2/2005 | Massengale et al. |
| 7,774,220 | B2 | 8/2010 | Sullivan et al. |
| 7,893,940 | B2 | 2/2011 | Mitchell et al. |
| 7,983,940 | B2 | 7/2011 | Hagmann et al. |
| 2001/0007976 | A1 | 7/2001 | Thompson et al. |
| 2001/0032092 | A1 | 10/2001 | Calver |
| 2002/0032574 | A1 | 3/2002 | Lowrance et al. |
| 2002/0042731 | A1 | 4/2002 | King, Jr. et al. |
| 2002/0049751 | A1 | 4/2002 | Chen et al. |
| 2002/0087476 | A1 | 7/2002 | Salas et al. |
| 2002/0112153 | A1 | 8/2002 | Wu et al. |
| 2002/0112612 | A1 | 8/2002 | Cusenza et al. |
| 2002/0133502 | A1 | 9/2002 | Rosenthal et al. |
| 2002/0194046 | A1* | 12/2002 | Sullivan et al. .............. 705/8 |
| 2003/0009373 | A1 | 1/2003 | Ensing et al. |
| 2003/0018519 | A1 | 1/2003 | Balz et al. |
| 2003/0033192 | A1 | 2/2003 | Zyman et al. |
| 2003/0070157 | A1 | 4/2003 | Adams et al. |
| 2003/0187725 | A1* | 10/2003 | Jotkowitz .................. 705/11 |
| 2003/0217117 | A1 | 11/2003 | Dan et al. |
| 2003/0222896 | A1 | 12/2003 | Hagmann et al. |
| 2004/0010709 | A1 | 1/2004 | Baudoin et al. |
| 2004/0044702 | A1 | 3/2004 | Ferreira Alves et al. |
| 2004/0054545 | A1 | 3/2004 | Knight |
| 2004/0215503 | A1* | 10/2004 | Allpress ......... G06Q 10/063112 705/7.39 |
| 2004/0236620 | A1 | 11/2004 | Chauhan et al. |
| 2005/0065841 | A1 | 3/2005 | Middleton |
| 2005/0096973 | A1* | 5/2005 | Heyse et al. ................ 705/11 |
| 2005/0171831 | A1 | 8/2005 | Johnson et al. |
| 2005/0283499 | A1 | 12/2005 | Fowler |
| 2006/0085455 | A1 | 4/2006 | Chmura et al. |
| 2006/0129419 | A1 | 6/2006 | Flaxer et al. |
| 2007/0027827 | A1* | 2/2007 | Balagaev ............ G06Q 10/10 706/45 |
| 2007/0061191 | A1 | 3/2007 | Mehrotra et al. |
| 2007/0112612 | A1 | 5/2007 | Dollens |
| 2007/0203710 | A1* | 8/2007 | Habichler et al. ............ 705/1 |
| 2009/0030711 | A1 | 1/2009 | Puccio et al. |
| 2009/0037241 | A1 | 2/2009 | Olsen et al. |
| 2009/0043630 | A1* | 2/2009 | Knieper ....................... 705/8 |
| 2009/0048957 | A1* | 2/2009 | Celano ....................... 705/35 |
| 2009/0177665 | A1 | 7/2009 | Callery et al. |
| 2010/0010880 | A1 | 1/2010 | Toth et al. |
| 2010/0082356 | A1* | 4/2010 | Verma et al. ................. 705/1 |
| 2010/0100408 | A1* | 4/2010 | Dion ........................... 705/8 |
| 2010/0257107 | A1 | 10/2010 | Sullivan et al. |
| 2010/0280935 | A1* | 11/2010 | Fellowes et al. ............ 705/35 |
| 2011/0066475 | A1 | 3/2011 | Sullivan et al. |

OTHER PUBLICATIONS

Sullivan, Daniel, "The Strategy Circle", The Strategic Coach, publication date unknown.
Sullivan, Daniel, "The Secrets of Success", CMA Magazine, Sep. 1998, vol. 72, No. 7, p. 22-25.
Sullivan, Daniel, "New economic rules call for 'personal focus" National Underwrite Life, Jul. 2, 1991, n 27A, p. 13(2).
Sullivan, Daniel, "Breaking through the ceiling of complexity". Life and health Insurance Sales, Jul. 1994, v137n7, p. 4-15.
Left, Michelle R., "The checkbook mentor" Life Association News, May 1998, v93n5, p. 8-96.
Morrow, Edwin P., "Asset Enhancement" Journal of Financial Planning, Apr. 1998, v11n2, p. 100-102.
The Strategic Coach, Inc., Where the Best Get Better downloaded from web.archive.orgtwww.strategiccoach.com [retrieved Dec. 14, 06).
The Strategic Coach, Inc., "Welcome to The Strategic Coach" (Nov. 27, 1999) home page of strategiccoach.com, downloaded from http://web.archive.org/web/19991112194745/www.strategiccoach.com/KPhome.htm [retrieved Jul. 6, 2008], 4 pages.
The Strategic Coach, Inc., "FAQs" (Jun. 1999) support page of strategiccoach.com, downloaded from http://web.archive.org/web/19991113040218/www.strategiccoach.com/software.htm [retrieved Jul. 6, 2008], 14 pages.
The Strategic Circle/Strategic Coach Program (1983-1997) U.S. Appl. No. 10/163,167 Artifact 10163637ZA, selected p. 5.
Avantos. "Avantos ManagePro 3.1", originally publication date unknown, downloaded from www.foremost-systems.com [retrieved Dec. 15, 2006).
Lifeplan. "Lifeplan—plan and live an excellent life!" as of Jun. 30, 1999, downloaded from web.archive.org/www.mindtools.com [retrieved Dec. 15, 2006).
Fulton, Jennifer. Easy Microsoft Outlook 97. Que: 1997, p. 156-158, 209-211.
McClure, David. "Goal-setting MBA Ware ideal for busy project managers," ORMS, Feb. 1996, vol. 23, No. 1, downloaded from www.lionhrtpub.com/orms [retrieved Jan. 4, 2007).
Russell Borland, Running Microsoft Outlook 97, Microsoft Press, Jun. 25, 1997, Chapter 8.
Claudia Willen, TheABCs of Outlook 97, Sybex Inc. ,Mar. 17, 1997, Chapters 8-14.
Final, dated Aug. 23, 2013, U.S. Appl. No. 12/641,000, filed Dec. 17, 2009.
Final, dated Nov. 13, 2013, U.S. Appl. No. 12/641,000, filed Dec. 17, 2009.
Final, dated Jun. 5, 2013, U.S. Appl. No. 12/641,000, filed Dec. 17, 2009.
Non-Final, dated Sep. 29, 2014, U.S. Appl. No. 12/561,111, filed Sep. 16, 2009.
Office Action dated Aug. 26, 2014 in Canada Application No. 2711875, filed Aug. 2, 2010.
Final Office Action, dated Mar. 13, 2015, U.S. Appl. No. 12/561,111, filed Sep. 16, 2009.
Office Action dated Jan. 27, 2016 in Canada Application No. 2711875, filed Aug. 2, 2010.
Uffelman, Jonathan, "A Practitioner's Guide to Section 101 Invalidity: Analyzing Abstract Concepts in the Wake of Alice v. CLS Bank", Patent, Trademark & Copyright Journal, ISSN 0148-7965, May 29, 2015, pp. 1-12.
Office Action dated Nov. 13, 2015 in Canada Application No. 2713371, filed Aug. 19, 2010.
Non-Final Office Action, dated Dec. 3, 2015, U.S. Appl. No. 12/641,000, filed Dec. 17, 2009.
Non-Final Office Action, dated Dec. 2, 2015, U.S. Appl. No. 12/561,111, filed Sep. 16, 2009.
Office Action dated Jan. 27, 2016 in Canada Application No. 2711875, filed Aug. 2, 2010, 7 pages.
Advisory Action, dated Sep. 8, 2016, U.S. Appl. No. 12/561,111, filed Sep. 16, 2009.
Advisory Action, dated Sep. 16, 2016, U.S. Appl. No. 12/641,000, filed Dec. 17, 2009.
Non-Final Office Action, dated May 19, 2017, U.S. Appl. No. 12/561,111, filed Sep. 16, 2009.
"Office Action," Canada Patent Application No. 2713371, dated Apr. 28, 2017, 8 pages.
"Pre-Appeal Review," Canada Patent Application No. 2711875, dated May 4, 2018, 5 pages.
"Office Action," Canada Patent Application No. 2713371, dated Aug. 13, 2018, 8 pages.
"What are the Relational Databases?" HowStuffWorks, Feb. 18, 2005 [retrieved on Jan. 2, 2019], Retrieved from the Internet: <URL:https://computer.howstuffworks.com/question599.htm>, 2 pages.
Kwak, Young Hoon et al. "Assessing Project Management Maturity," Project Management Journal, vol. 31, Mar. 1, 2000. p. 32-43, 24 pages.
Andersen, Erling S. et al. "Project Maturity in Organisations," International Journal of Project Management, vol. 21, Aug. 6, 2003, p. 457-461, 5 pages.
"Office Action," dated May 19, 2017 in U.S. Appl. No. 12/561,111, filed Sep. 16, 2009,45 pages.

(56) References Cited

OTHER PUBLICATIONS

"Pre-Appeal Review," Canada Patent Application No. 2711875, dated Feb. 6, 2020, 18 pages.
Office Action dated Sep. 23, 2014 in Canada Application No. 2713371, filed Aug. 19, 2010.
Notice of Allowance, dated Dec. 29, 2009, U.S. Appl. No. 10/163,637, filed Jun. 7, 2002.
Non-Final, dated May 23, 2012, U.S. Appl. No. 12/561,111, filed Sep. 16, 2009.
Final, dated Jan. 31, 2013, U.S. Appl. No. 12/561,111, filed Sep. 16, 2009.
Non-Final, dated Aug. 16, 2012, U.S. Appl. No. 12/641,000, filed Dec. 17, 2009.
Final Office Action, dated Jun. 9, 2016, U.S. Appl. No. 12/561,111, filed Sep. 16, 2009.
Final Office Action, dated Jun. 13, 2016, U.S. Appl. No. 12/641,000, filed Dec. 17, 2009.
"Office Action", Canada Patent Application No. 2711875, dated Aug. 6, 2020, 36 pages.
"Machine learning." A Dictionary of Computing, 6 ed., edited by John Daintith and Edmund Wright, Oxford University Press, 2008, 1 page.

* cited by examiner

| Monday | Tuesday | Wednesday | Thursday | Friday | Saturday | Sunday |
|---|---|---|---|---|---|---|
| October 1 | 2 | 3 | 4 | 5 | 6 | 7 |
| PREPARATION 410 | FOCUS | PREPARATION | FOCUS | PREPARATION | FREE | FOCUS |
| 8 | 9 | 10 | 11 | 12 | 13 | 14 |
| FOCUS | PREPARATION | FREE | PREPARATION | FOCUS | PREPARATION | FREE |
| 15 | 16 | 17 | 18 | 19 | 20 | 21 |
| FREE | FOCUS | PREPARATION | FOCUS | FREE | FREE | PREPARATION |
| 22 | 23 | 24 | 25 | 26 | 27 | 28 |
| FOCUS | PREPARATION | FOCUS | PREPARATION | FOCUS | FOCUS | FREE |
| 29 | 30 | 31 | November 1 | 2 | 3 | 4 |
| PREPARATION | FREE | PREPARATION | | | | |

MANAGING PROFESSIONAL DEVELOPMENT

BACKGROUND

1. Field of Invention

This invention relates generally to professional development and more specifically to managing professional development.

2. Description of Related Art

There are a variety of online applications available to help an individual manage various aspects of life, such as quitting smoking, losing weight, earning an occupational certification, etc. Some of these programs may be led by a mentor or coach who guides the individual through a step-by-step process. For example, a weight loss program may include a menu, a weight tracker, and an exercise regimen. The individual may report their weight to the weight tracker via email, instant message, text message, etc. The weight tracker may update the current weight information accordingly.

Some programs are associated with large online communities, which provide support toward a common goal, such as losing weight. The members of the community may report progress, ask questions, and receive answers, encouragement, and tips on losing weight to the other members. Because the loss of weight is nearly always associated with eating fewer calories or expending more calories, nearly all members of such a community are concerned with the same or similar issues: food, calories, exercise, etc.

In comparison, professional development is more difficult to measure and track than weight, number of cigarettes smoked, or number of credits earned toward a certificate. Professional goals may be based on multiple issues that are unique to the individual professional. For example, professional development takes into account an income level, work-life balance, type of profession, tasks unique to the profession, etc. Further, the analysis of such factors is complicated by differing requirements and standards by industry. As such, most professional development programs are conducted on an individual basis or within small groups of similar individuals. Such programs are generally costly, because the development staff must tailor the program to each individual. It is generally difficult to scale such individualized services. It may also be difficult to coordinate a group of individuals for professional development, especially for less common professions or in less populated areas.

There is, therefore, a need for improved systems and methods for managing professional development.

SUMMARY

Exemplary systems and methods for managing professional development are provided. A client provides status information, which may include information about a professional task performed by the client and a portion of income associated with the task. The progress of the client toward a professional goal is calculated, and a recommendation concerning an appropriate next step is communicated to the client. Professional goals may include a level of income, efficiency, type of tasks performed, etc.

Embodiments include methods for managing professional development. Such methods may include receiving status information concerning a client, identifying a professional goal associated with the client, calculating client progress toward the professional goal, determining a next step toward the professional goal, and generating a recommendation concerning the next step. The status information may indicate, for example, a particular professional task and the portion of client income earned from performance of that professional task. In some embodiments, such information may be used to generate a projected income for a day dedicated to the professional task and determine a number of dedicated days required to achieve the professional goal.

Methods may further include classifying the professional task and determining a proportion of income attributed to each classification of professional tasks. Such classifications may be based on a level of reliance on commodities. For example, a professional task may be classified as commodity-based, partially or indirectly commodity-based, and not at all based on commodities. A professional goal may include achieving a particular proportion of such classified tasks.

Some methods yet further include identifying highly profitable professional tasks and setting a baseline for professional tasks based on such identification. In some instances, intermediate goals between the minimum baseline and the professional goal may be set. The professional goal may include achieving a certain income goal, and the identification of profitable tasks allows individuals to focus their efforts on those tasks.

Further embodiments include systems for managing professional development. Such systems may include a memory for storing client information, a processor executable to identify a professional goal associated with a client, calculate client progress, determine a next step, and generate a recommendation. Systems may further include a focus day calculator module, an entrepreneurial time calendar module, an intellectual capital calculator, and a largest check calculator module. Each calculator module may be used separately or in combination with each other in a particular program.

Embodiments of the present invention may yet further include computer-readable storage media, having embodied thereon programs for executing methods for managing professional development.

BRIEF DESCRIPTION OF THE DRAWINGS

FIG. 4 illustrates a calendar generated in an exemplary implementation of a method for managing professional development.

DETAILED DESCRIPTION

Embodiments of the present invention provide systems and methods for managing professional development. A client provides status information, which may include information about a professional task performed by the client and a portion of income associated with the task. The progress of the client toward a professional goal is calculated, and a recommendation concerning an appropriate next step is communicated to the client. Professional goals may include a level of income, efficiency, type of tasks performed, etc.

Figure 1:
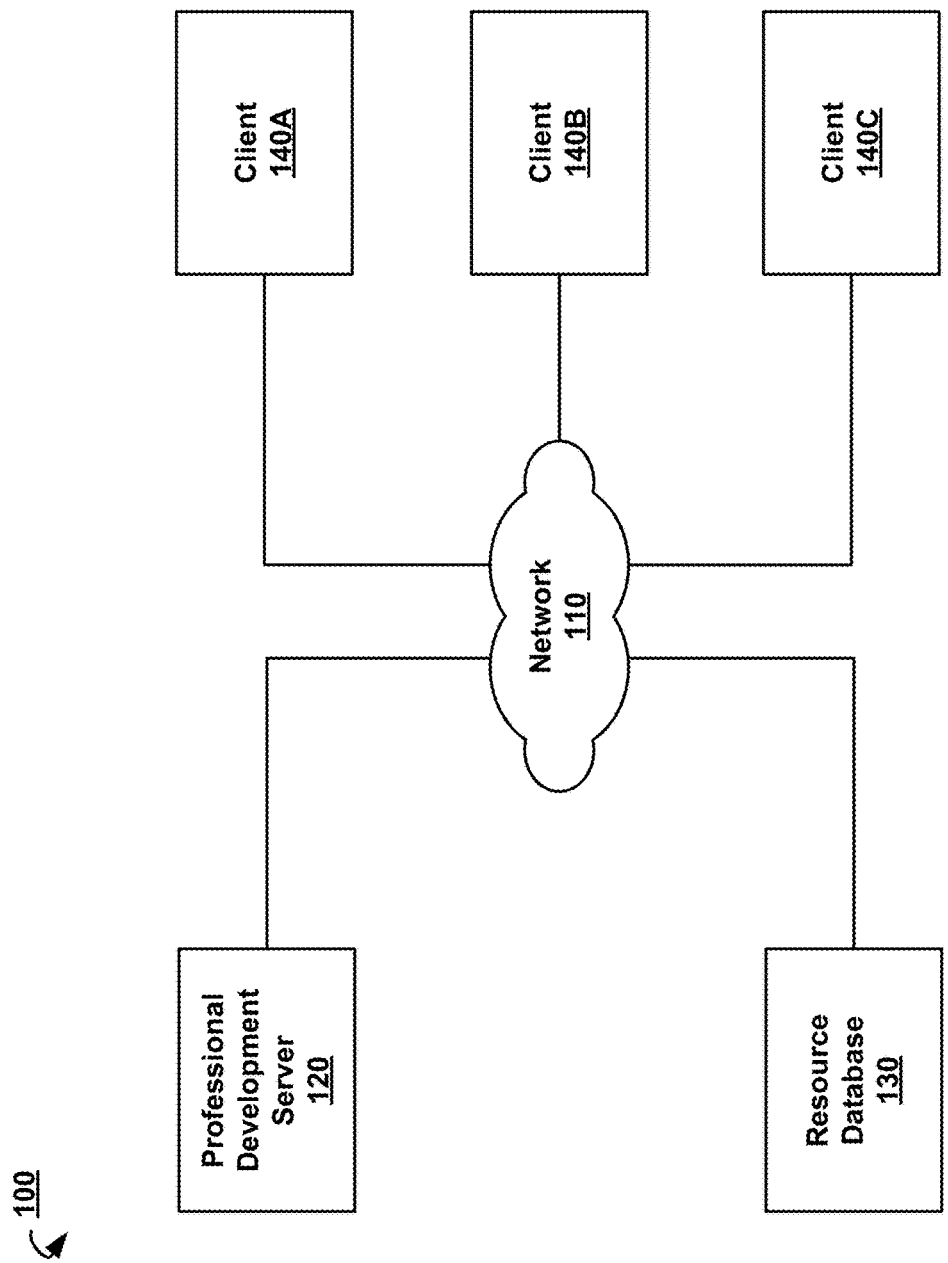
FIG. 1 is a diagram of an exemplary computing environment in which an exemplary system for managing professional development may be practiced.

FIG. 1 is a diagram of an exemplary computing environment 100 in which an exemplary system for managing professional development may be practiced. The environment 100 comprises a computing network 110, professional development server 120, resource database 130, and clients 140A-C. Professional development server 120, resource database 130, and clients 140A-C may each comprise one or more computing devices. A computing device may include a desktop computer, a laptop computer, a server, a handheld computer, a smartphone, a personal digital assistant, etc.

Network 110 may be a local, proprietary network (e.g., intranet) and/or may be a part of a larger wide-area network. For example, the network 110 may be a local area network (LAN), which may also be communicatively coupled to a wide area network (WAN) such as the Internet. Network 110 allows for communication between the various components of environment 100.

Professional development server 120 (described in further detail with respect to FIG. 2) can communicates with one or more client devices 140A-C over network 110. Clients 140A-C who are interested in obtaining professional development services may request and obtain such services via their interaction with professional development server 120. Such clients 140A-C may provide personal status information, and professional development server 120 can determine client progress toward a professional goal and provide recommendations for achieving further progress toward the professional goal.

Environment 100 may further include a resource database 130, which may be housed with professional development server 120 or, as illustrated, in a separate device. Resource database 130 serves as a repository for storing any kind of training materials (i.e., literature, exercises, video/audio). Some professional development programs for certain clients may incorporate such training materials, which may be accessed and provided to the client from resource database 130.

Client devices 140A-C may comprise any combination of computer hardware and software configured to receive and transmit information over network 110, thereby communicating with professional development server 120 and/or resource database 130.

Figure 2:
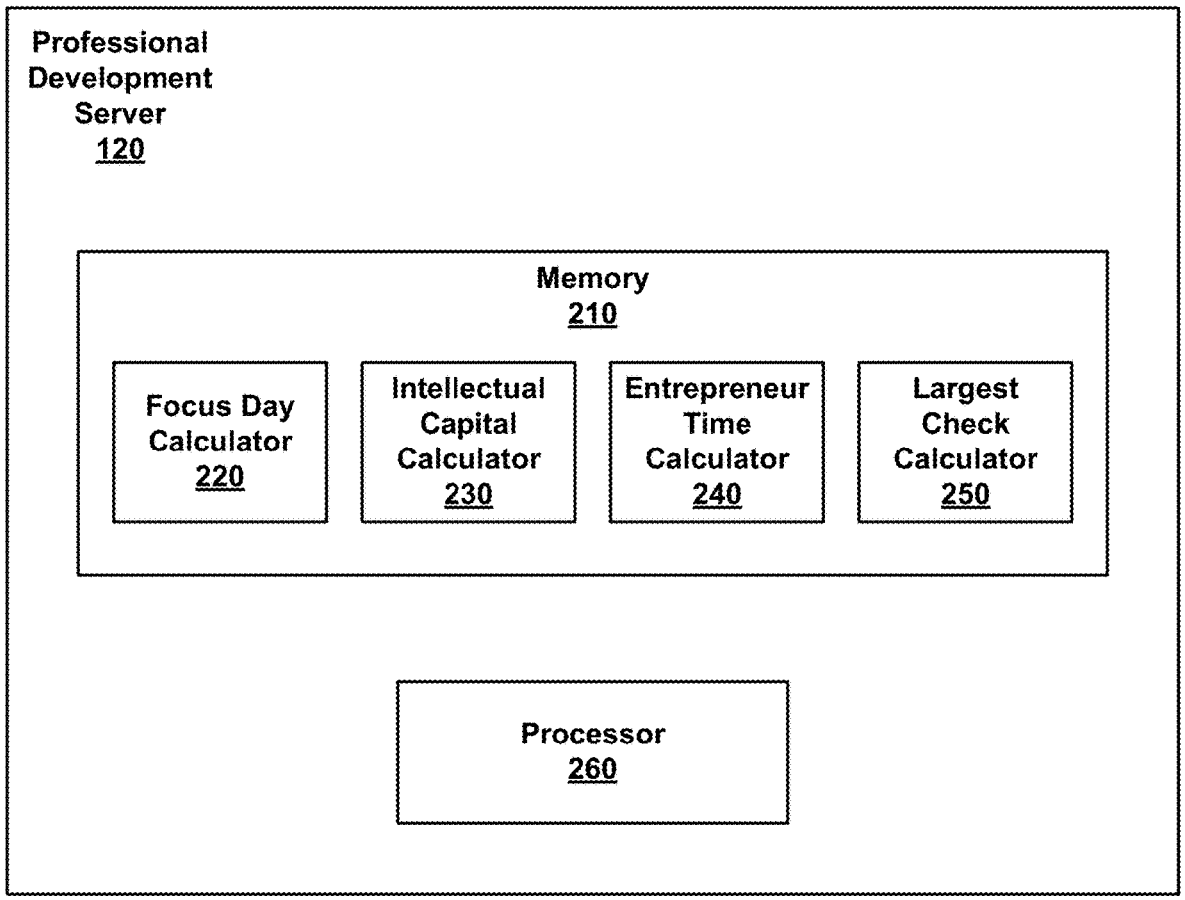
FIG. 2 is a block diagram of an exemplary professional development server.

FIG. 2 is a block diagram of an exemplary professional development server 120. Professional development server 120 may include a memory 210, which stores a focus day calculator 220 module, an intellectual capital calculator 230 module, an entrepreneur time calculator 240 module, and a largest check calculator 250 module. Professional development server 120 may further include a processor 260 for executing various instructions and modules stored in memory 210.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

Focus day calculator 220 module allows for evaluation and maximizing productivity of a professional task. For example, a client may provide information concerning a particular task and a portion of income attributed to the task. Focus day calculator 220 is executable by the processor 260 to determine how much income can be earned in a day that is dedicated to the professional task. For example, if the task is sales, focus day calculator 220 determines how much income can be earned in a single day that is mostly or wholly devoted to sales. Based on the determined income, focus day calculator 220 generates a recommendation on how to maximize such productivity. For example, focus day calculator 220 may determine how many "focus day" (i.e., days dedicated to performance of the task) are required to achieve a professional goal (i.e., a desired income level). Focus day calculator 220 may then, as part of the recommendation, generate a schedule or timeline comprising the determined number of "focus days."

Intellectual capital calculator 230 module is based on classification of the professional task. Such classification may be based on level of reliance on commodities. For example, a task may be classified as being mostly/wholly reliant on commodities, partially/indirectly reliant on commodities, or independent of any reliance on commodities. Intellectual capital calculator 230 is executable by processor 260 to determine what proportion of income is attributed to each classification. Achieving the professional goal may include achieving a particular proportion of professional tasks with respect to reliance or independence from commodities. The professional goal may include a particular proportion or range of proportions, which may vary based on the industry. In some industries, some reliance on commodities may be unavoidable and/or common, while in others industries, reliance or independence from commodities may be a major disadvantage or advantage, respectively.

Entrepreneur time calculator 240 module is executable by processor 260 to determine scheduling around the "focus days" discussed with respect to the focus day calculator 220. Days that are not dedicated to performance of the professional task may be divided into free days and preparation days. Free days are allocated for rest, relaxation, recovery, etc., in order to rejuvenate and energize a client for the rest of the schedule. Preparation days are allocated to preparation for either the free days or the "focus days." In some embodiments, a "focus day" may itself include activities geared toward success of the professional task. For example, if the professional task is sales, a "focus day" may include not only making sales, but developing customer relationships and opportunities for sales in the short-term and long-term. As such, preparation days may include various administrative tasks, such as scheduling meetings, accounting, filing, etc.

Largest check calculator 250 module allows a client to identify their most profitable tasks or sources of income and sets goals based on such identification. For example, a client may identify four or five of their largest sales accounts. Largest check calculator 250 is executable by processor 260 to generate an average profit among the identified accounts. Based on the average, largest check calculator 250 may determine that a minimum baseline be set for future sales account. For example, if the average is $100,000, a minimum baseline of $75,000 may be set. The client could then use the baseline to focus their efforts on accounts that are at least $75,000 and delegate or decline smaller accounts. Largest check calculator 250 may further set an intermediate goal for future accounts. For example, if the professional goal is have an average of $1 million accounts, an intermediate goal may be $500,000. A recommendation generated by largest check calculator 250 may therefore indicate a range of tasks upon which to focus.

Figure 3:
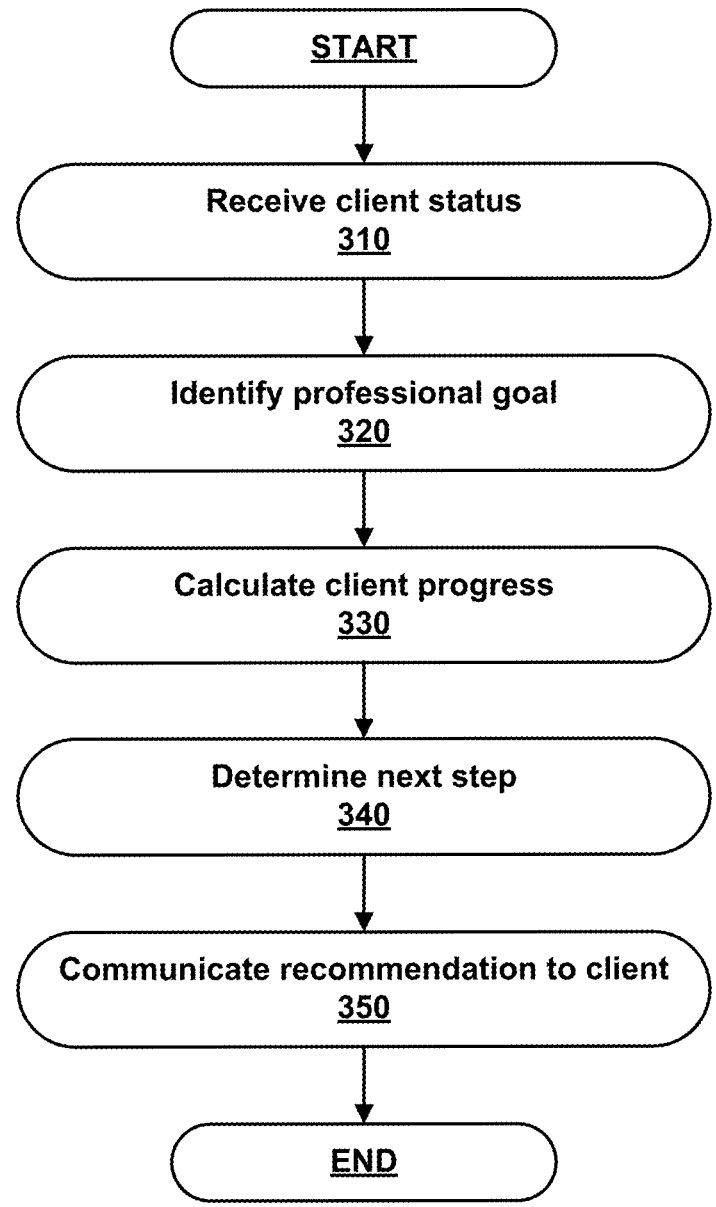
FIG. 3 is a flowchart illustrating an exemplary method for managing professional development.

FIG. 3 is a flowchart illustrating an exemplary method 300 for managing professional development. In method 300, information concerning client status is received, and a professional goal is identified with respect to the client. Client progress is calculated, and a next step is determined. A recommendation concerning the next step is then communicated to the client.

In step 310, information concerning client status is received. Client 140A may provide information concerning a current professional status, including job title, industry, current income, working hours, types of tasks performed in the job, etc. In some instances, client 140A may already be involved in a program for professional development. As such, information regarding client 140A may have been previously provided and the information received in step 310 is an update to the previously provided information.

In step 320, a professional goal is identified based on the client information provided. For continuing clients, a professional goal may have been previously identified. For new clients, one or more professional goals may be generated based on the information provided by the client. In some cases, the client may be queried to focus a professional goal (i.e., desired income level, desired proportion of working days to days off). In some cases, a professional goal may be changed and updated based on progress or achievement. For example, a client who has progressed/achieved one professional goal may wish to set a more challenging goal or focus on a different type of professional goal.

In step 330, client progress is calculated. Client progress may be determined by any of the calculator modules stored in memory: focus day calculator 220, intellectual capital calculator 230, entrepreneur time calculator 240, or largest check calculator 250. The progress calculated by focus day calculator 220 involves determining a projected income of a "focus day." In such an instance, the professional goal may be increasing income by increasing the number of "focus days" or more ideally, increasing income earned on each "focus day." Client progress calculated by intellectual capital calculator 230 determines the proportion of income derived from a task classification, in which the professional goal may be achieving a desired proportion (i.e., decreasing reliance on commodities). For entrepreneur time calculator 240, client progress may be determined based on how well the client adheres to a schedule of designated "focus days," preparation days, and free days. Largest check calculator 250 determines client progress with respect to increasing average income from tasks identified as most profitable.

In step 340, a next step is determined. Focus day calculator 220 determines how many "focus days" are required to reach a professional goal. For an ongoing client who provides updated information regarding productivity or goals, the number of required "focus days" may change. Intellectual capital calculator 230 may compare the proportions of whole/partial/non-commoditized income to goal proportions and indicate which types of tasks need further focus. Entrepreneur time calculator 240 performs a similar function with respect to proportions of "focus"/preparation/free days. Largest check calculator 250 establishes a minimum baseline to focus on more profitable tasks.

In step 350, a recommendation concerning the next step is communicated to the client. In some circumstances (i.e., use of focus day calculator 220, entrepreneur time calculator 240), the recommendation is a schedule. Alternatively, the recommendation may indicate focus on a particular type of task (i.e., use of intellectual capital calculator 230, largest check calculator 250).

FIG. 4 illustrates a calendar 400 generated in an exemplary implementation of a method for managing professional development. A recommendation may comprise a calendar with a schedule developed according to one or more calculators. Each day indicates a category 410 (e.g., free, preparation, "focus").

"Free day," "focus day," and "preparation day" are used to signify the types of activities that are performed by the user during a given day. During a free day, the user may spend time on activities that rejuvenate the user for the other days. Free days may include time with family and friends, community activities, or developing personal interests. On a free day, the user does not engage in business related activities.

In contrast, during a focus day, the user may focus on professional tasks, such as business relationship building activities, client appointments, and strategic activities. The focus day is meant to be spent on the most productive (result-oriented) activities. During a preparation day, the user may spend time on following up on "focus day" actions, administrative tasks, and preparing for free days and focus days.

In the calendar depicted in FIG. 4, the recommendation comprises a monthly calendar. For each day of the month, the planned free days, the planned preparation days, and the planned "focus days" may be depicted near the top of the box corresponding to the day. For example, Monday, October 1, is a designated preparation day.

Figure 5:
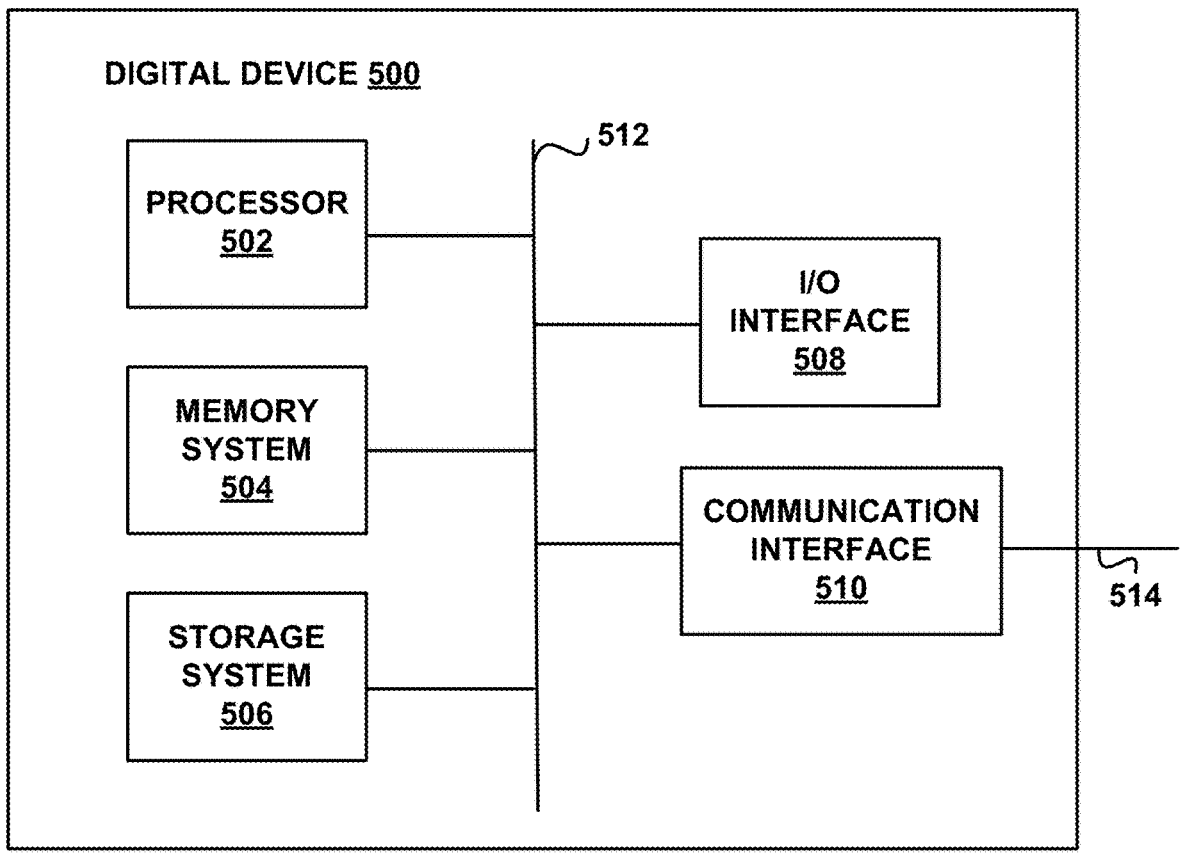
FIG. 5 depicts a computing device according to various embodiments.

FIG. 5 depicts a computing device 500 according to various embodiments. The computing device 500 comprises a processor 502, a memory system 504, a storage system 506, an input/output (I/O) interface 508, and a communication interface 510, which are all coupled to a system bus 512. Like processor 260, processor 502 is configured to execute executable instructions. In some embodiments, the processor 502 comprises circuitry or any processor capable of processing the executable instructions.

The memory system 504 is any memory configured to store data. Some examples of the memory system 504 are storage devices, such as RAM or ROM. The storage system 506 is any storage configured to retrieve and store data. Some examples of the storage system 506 are flash drives, hard drives, optical drives, and/or magnetic tape. The storage system 506 can comprise a data structure configured to hold and organize data.

The I/O interface 508 is any device that can receive data from a user or provide data to the user. The I/O interface 508 can include, but is not limited to, a keyboard, a monitor, a mouse, a speaker, a microphone, or a camera.

The communication interface 510 can be coupled to any digital device via the link 514. The communication interface 510 may support communication over a USB connection, a firewire connection, an Ethernet connection, a serial connection, a parallel connection, or an ATA connection. The communication interface 510 may also support wireless communication (e.g., 802.11 a/b/g/n or wireless USB). It will be apparent to those skilled in the art that the communication interface 510 can support many wired and wireless standards.

Some of the above-described functions can be composed of instructions that are stored on storage media (e.g., computer-readable medium). The instructions may be retrieved and executed by the processor 502. Some examples of storage media are memory devices, tapes, disks, integrated circuits, and servers. The instructions are operational when executed by the processor 502 to direct the processor 502 to operate in accord with the invention. Those skilled in the art are familiar with instructions, processor(s), and storage media.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for managing professional development for a plurality of clients in a plurality of professions, the method comprising:

storing training materials in one or more resource databases coupled to a development server, the training materials including literature, exercises, video, and audio media;

for each client in a profession, receiving at the development server via a network client information indicating a current status of the client, the current status comprising:

a plurality of profitable professional tasks performed by the client, the profitable professional tasks being variable based on a professional industry;

an amount of profit for each of the professional tasks performed by the client; and at least two or more of:

job title;
professional industry;
working hours; and
current income;

executing instructions stored in memory of the development server to set a professional goal for each of the clients, wherein the instructions to set the professional goal for each of the clients are executed by a processor of the development server to:

identify the professional goal associated with the client based on the received current status of the client, calculate client progress toward the identified professional goal based on the received current status of the client, calculate a number of dedicated days required to achieve the identified professional goal, the calculation based on the calculated client progress using a focus day calculator, to evaluate and maximize productivity, calculate a minimum income baseline for the profitable professional tasks based on the amount of profit for each of the professional tasks using a largest check calculator, and generate an intermediate professional goal between the baseline and the identified professional goal using the largest check calculator, the intermediate professional goal including an income goal based on the minimum income baseline, the amount of profit for each of the professional tasks, the calculated client progress, and the calculated number of dedicated days;

accessing training materials for each client from the resource database, the accessed training materials including at least two of the literature, exercises, video, and audio media to be provided to the client via the network;

automatically communicating from the development server via the network to each of the clients a professional development program incorporating the training materials accessed from the resource database for a respective client and including a recommendation for achieving the intermediate professional goal generated for the respective client, the recommendation indicating the calculated number of dedicated days required to achieve the intermediate professional goal, the minimum income baseline, and a plurality of tasks upon which to focus, the recommendation comprising a calendar scheduling the dedicated days based on at least one of the largest check calculator and the focus day calculator;

receiving an update, via the network, to the client information indicating an updated status of the client, wherein the updated status includes updated information of the previously provided information regarding productivity or progress made by the client towards the professional goal based on the client's adherence to the calendar scheduling the dedicated days;

modifying the professional goal based on the updated status of the client; and dynamically updating the calendar by modifying the scheduling of the dedicated days in accordance with the updated status of the client.

2. The method of claim 1, wherein the client information comprises information concerning a portion of client income associated with a professional task.

3. The method of claim 1, wherein the professional task is associated with a classification and wherein calculation of the client progress comprises determining a proportion of income attributed to professional tasks associated with the classification.

4. The method of claim 3, wherein the classification is based on a level of reliance on industrial commodities.

5. The method of claim 3, further comprising comparing the proportion of income to the professional goal, the professional goal being defined based on the professional industry of the client.

6. The method of claim 2, wherein calculation of the client progress comprises generating an average income associated with a plurality of professional tasks, the plurality of professional tasks having been identified by the client as most profitable.

7. The method of claim 6, further comprising establishing the minimum income baseline.

8. The method of claim 7, wherein the recommendation comprises a schedule developed according to one or more calculators, the schedule regarding types of activities recommended to be performed during each day.

9. The method of claim 1, wherein the recommendation for achieving the generated intermediate professional goal further comprises a schedule of a number of non-dedicated days, the non-dedicated days including free days and preparation days, the preparation days dedicated to preparing for dedicated days or free days.

10. The method of claim 1, wherein the recommendation further comprises identified opportunities for short-term results and identified opportunities for long-term results, the identified opportunities related to a professional task.

11. The method of claim 1, wherein the professional goal is an efficiency goal for a profession of the plurality of professions, each of the plurality of professions having a different efficiency goal.

12. The method of claim 1, wherein at least one of the recommendations is from a resource database of training materials for the plurality of professions.

13. A system for managing professional development for a plurality of clients in a plurality of different professions, the system comprising:
   a memory configured to store client information for each client indicating a status of the client, the status comprising:
      a plurality of profitable professional tasks performed by the client, the profitable professional tasks being variable based on a professional industry;
      an amount of profit for each of the professional tasks performed by the client; and
      at least two or more of:
         job title;
         professional industry;
         working hours;
         current income; and
         a professional task performed by the client;
   a processor configured to execute instructions stored in memory for:
      identifying a professional goal associated with the client based on the received current status of the client,
      calculating client progress toward the identified professional goal based on the received current status of the client,
      calculating a number of dedicated days required to achieve the identified professional goal, the calculation based on the calculated client progress using a focus day calculator,
      calculating a minimum income baseline for the profitable professional tasks based on the amount of profit for each of the professional tasks using a largest check calculator,
      generating an intermediate professional goal between the baseline and the identified professional goal using the largest check calculator, the intermediate professional goal including an income goal based on the minimum income baseline, the amount of profit for each of the professional tasks, the calculated client progress, and the calculated number of dedicated days,
      accessing stored training materials for each client from a resource database, the accessed training materials including at least the two of literature, exercises, video, and audio media to be provided to the client,
      receiving an update, via the network, to the client information indicating an updated status of the client, wherein the updated status includes updated information of the previously provided information regarding productivity or progress made by the client towards the professional goal based on the client's adherence to a calendar scheduling a dedicated days,
      modifying the professional goal based on the updated status of the client, and
   an interface configured to:
      automatically communicate to the client a professional development program incorporating the accessed training materials accessed for a respective client and including a recommendation for achieving the intermediate professional goal generated for the respective client, the recommendation indicating the calculated number of dedicated days required to achieve the intermediate professional goal, the minimum income baseline, and a plurality of tasks upon which to focus, the recommendation including a customized calendar with a schedule developed according to at least one of the largest check calculator and the focus day calculator, and
      dynamically updating the customized calendar, the updated customized calendar including a change of the number of dedicated days required to achieve the modified professional goal.

14. The system of claim 13, wherein the client information comprises information concerning a portion of client income associated with the professional task.

15. The system of claim 14, further comprising a focus day calculator module stored in memory and executable by the processor to:
   generate a projected income for a day dedicated to performance of the professional task; and
   determine a number of dedicated days required to achieve the professional goal.

16. The system of claim 15, further comprising an entrepreneurial calendar module stored in memory and executable by the processor to generate a schedule comprising the determined number of dedicated days and non-dedicated days, the non-dedicated days including free days and preparation days, the preparation days dedicated to preparing for dedicated days or free days.

17. The system of claim 14, wherein the professional task is associated with a classification and further comprising an intellectual capital calculator module stored in memory and executable by the processor to determine a proportion of income attributed to professional tasks associated with the classification.

18. The system of claim 14, further comprising a largest check calculator module stored in memory and executable by the processor to:
   generate an average income associated with a plurality of professional tasks, the plurality of professional tasks having been identified by the client as most profitable;
   establish a minimum income baseline; and
   determine a range of professional tasks for focus based on the minimum income baseline and the professional goal.

19. A non-transitory computer-readable storage medium having embodied thereon a program, the program executable by a processor to perform a method for managing professional development for a plurality of clients in a plurality of different professions, the method comprising:
   for each client in a profession, receiving information indicating a current status of the client, the current status comprising:
      a plurality of profitable professional tasks performed by the client, the profitable professional tasks being variable based on a professional industry;
      an amount of profit for each of the professional tasks performed by the client; and
      at least two or more of:
         job title;
         professional industry;
         working hours; and
         current income;
   identifying a professional goal associated with the client based on the received current status of the client;
   calculating client progress toward the identified professional goal based on the received current status of the client;
   calculating a number of dedicated days required to achieve the identified professional goal, the calculation based on the calculated client progress using a focus day calculator;
   calculating a minimum income baseline for the profitable professional tasks based on the amount of profit for each of the professional tasks using a largest check calculator;
   generating an intermediate professional goal between the baseline and the identified professional goal using the largest check calculator, the intermediate professinal goal including an income goal based on the minimum income baseline, the amount of profit for each of the professional tasks, the calculated client progress, and the calculated number of dedicated days;
   accessing stored training materials for each client from a resource database, the accessed training materials including at least two of the literature, exercises, video, and audio media to be provided to the client;
   automatically communicating to each of the clients a professional development program incorporating the accessed training materials accessed for a respective client and including a recommendation for achieving the intermediate professional goal generated for the respective client, the recommendation indicating the calculated number of dedicated days required to achieve the intermediate professional goal, the minimum income baseline, and a plurality of tasks upon which to focus, the recommendation including a customized calendar with a schedule developed according to at least one of the largest check calculator and the focus day calculator;
   receiving an update, via the network, to the client information indicating an updated status of the client, wherein the updated status includes updated information of the previously provided information regarding productivity or progress made by the client towards the professional goal based on the client's adherence to the calendar scheduling the dedicated days;
   modifying the professional goal based on the updated status of the client; and
   dynamically updating the customized calendar, the updated customized calendar including a change of the number of dedicated days required to achieve the modified professional goal.

20. The non-transitory computer readable storage medium of claim 19, wherein the information indicating a current status of the client comprises information concerning a portion of client income associated with a professional task.

* * * * *